UNITED STATES PATENT OFFICE.

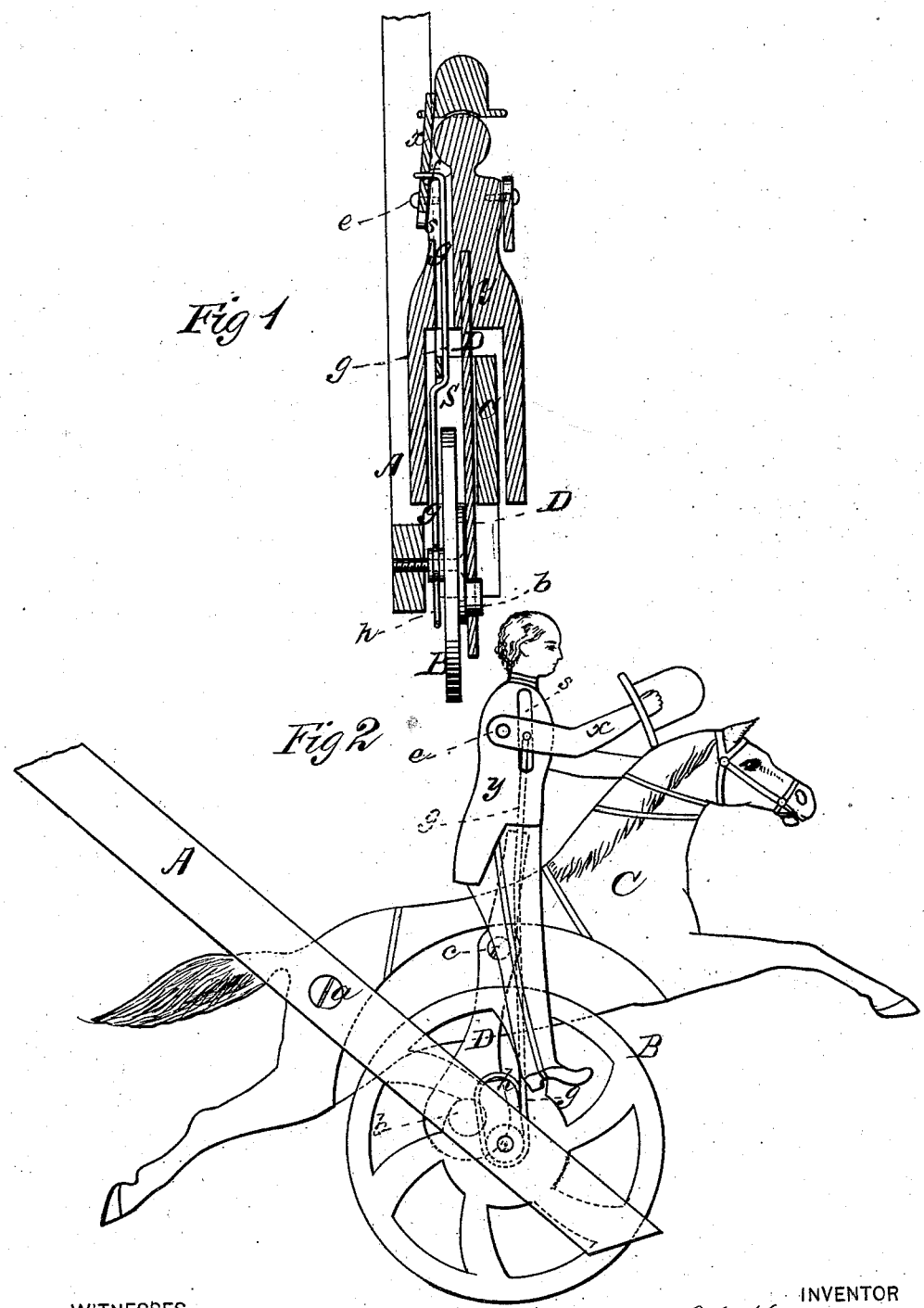

EDWARD C. KIRKPATRICK, OF CAMDEN, NEW JERSEY.

IMPROVEMENT IN TRUNDLE-TOYS.

Specification forming part of Letters Patent No. 203,165, dated April 30, 1878; application filed September 29, 1877.

*To all whom it may concern:*

Be it known that I, EDWARD C. KIRKPATRICK, of Camden, in the county of Camden and State of New Jersey, have invented a new and valuable Improvement in Toys; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a cross-sectional view of my toy, and Fig. 2 is a side view thereof.

This invention has relation to improvements in toy-horses; and the nature of the invention consists in combining with a staff, carrying in its end a trundling-wheel, a horse pivoted to the said staff in rear of said wheel, and connected, by a pitman, with a wrist-pin or eccentric on said wheel, whereby the horse-figure is made to present the appearance of galloping when the wheel is placed upon the ground and propelled.

It also consists in combining with the staff, its wheel, the horse pivoted to said staff, and a pitman connecting the horse and wheel, a figure mounted upon the horse, having a vibrating arm, carrying a hat, connected, by means of a rigid rod, with the spindle of said wheel, whereby, during the galloping of the horse, the figure is made to take off and replace the hat, as will be hereinafter more fully explained.

In the annexed drawings, the letter A designates a staff designed to be held in the hand, and carrying on its lower end a wheel, B. C represents the horse as galloping, and pivoted, at *a*, near its rump, to the said staff in rear of said wheel. This wheel is provided with a wrist-pin, *b*, or other equivalent device, to which is secured, in the usual manner, a lever-pitman, D, that extends up through a longitudinal slot, S, in the body of the horse, and is fulcrumed thereto at *c*, at or about the center of its length.

Upon the upper end of the lever-pitman is secured the figure of a man or other animal, with its legs astraddle of the horse.

When the wheel is placed upon the ground and thrust forward, a rocking or oscillating motion, resembling that of a galloping horse, will be imparted to the figure of the horse, while the figure of the man will be swung back and forth, thus simulating the motions of one riding a horse at full gallop.

One of the arms, *x*, of the figure of a man, *y*, is pivoted, at *e*, to its shoulder, and is connected to a short horizontal arm, *f*, extending through a slot, *s*, in the body of the man, of an angular rod, *g*, extending down through the bodies of the man and horse, and looped over the journal of the wheel, as shown at *h*, Fig. 2. This loop is oblong, thereby allowing the horse-figure to rise and fall in galloping, as the wheel turns over, a distance equal to the length of the slot or loop *h*, without moving the arm; but having risen beyond this distance, the continuing rise causes the connecting-rod to be drawn down and the arm to swing to the front, thereby removing a hat from the head of the figure of a man.

During the falling movement of the horse the arm remains stationary until the animal has fallen the length of the slot of the loop, when the arm is swung up and the hat replaced.

It will be seen that there is an interval of complete rest after each motion of the arm, which, in its normal position, is grasping the hat, and that the removal and replacing the hat resembles the salute of an officer or official to a cheering crowd.

It will also be seen that this motion of the arm is produced by the pitman-lever directly through the medium of the connecting-rod.

What I claim as new, and desire to secure by Letters Patent, is—

The combination, with the staff A, having wheel B, and the animal figure C, pivoted to said staff, of the lever-pitman D, extending through the body of said animal figure, the figure *y* upon the end of said lever, and having the vibrating arm *x* and the angular connecting-rod *g*, engaging said arm and looped around the spindle of said wheel, substantially as specified.

In testimony that I claim the above I have hereunto subscribed my name in the presence of two witnesses.

EDWARD C. KIRKPATRICK.

Witnesses:
ALLEN H. GANGEWER,
DE LANCEY G. WALKER.